United States Patent
Togashi

(10) Patent No.: US 9,515,489 B2
(45) Date of Patent: Dec. 6, 2016

(54) FEED SYSTEM TO BE USED IN RESIDENCE SUCH AS MULTI-UNIT APARTMENT COMPLEX

(75) Inventor: Koji Togashi, Tokyo (JP)

(73) Assignee: GLOBAL LINK CO., LTD., Tokyo (JP)

( * ) Notice: Subject to any disclaimer, the term of this patent is extended or adjusted under 35 U.S.C. 154(b) by 992 days.

(21) Appl. No.: 13/555,250

(22) Filed: Jul. 23, 2012

(65) Prior Publication Data

US 2013/0113281 A1 May 9, 2013

(30) Foreign Application Priority Data

Nov. 7, 2011 (JP) ................... 2011-243003
Jan. 27, 2012 (JP) ................... 2012-015198
Mar. 27, 2012 (JP) ................... 2012-001685

(51) Int. Cl.
 *H02J 9/00* (2006.01)
 *H02J 3/38* (2006.01)
 *H02J 7/35* (2006.01)

(52) U.S. Cl.
 CPC .............. *H02J 3/383* (2013.01); *H02J 7/35* (2013.01); *Y02B 10/14* (2013.01); *Y02E 10/563* (2013.01); *Y02E 10/566* (2013.01); *Y10T 307/344* (2015.04)

(58) Field of Classification Search
 CPC ... Y02B 10/14; Y02E 10/566; Y02E 10/563; H02J 7/35; H02J 3/383
 USPC .................................................. 307/64, 65
 See application file for complete search history.

(56) References Cited

U.S. PATENT DOCUMENTS

| | | | | |
|---|---|---|---|---|
| 3,797,876 A | * | 3/1974 | Gummelt ............ | H01M 2/1005 16/423 |
| 3,871,924 A | * | 3/1975 | DeMattie ............. | H01M 2/024 16/444 |
| 4,742,291 A | * | 5/1988 | Bobier ...................... | H02J 7/35 136/293 |
| 5,500,561 A | * | 3/1996 | Wilhelm ................... | H02J 1/06 307/48 |
| 6,512,966 B2 | * | 1/2003 | Lof ........................ | F03D 7/0284 290/44 |
| 6,560,131 B1 | * | 5/2003 | vonBrethorst ........ | H02J 7/0055 361/673 |
| 8,269,374 B2 | * | 9/2012 | De Caires ................ | H02J 7/35 307/66 |

(Continued)

FOREIGN PATENT DOCUMENTS

JP 09-045950 A 2/1997

*Primary Examiner* — Rexford Barnie
*Assistant Examiner* — Elim Ortiz
(74) *Attorney, Agent, or Firm* — McGlew and Tuttle, P.C.

(57) ABSTRACT

A photovoltaic array (11) for generating DC power by receiving sunlight is installed in a balcony (1) of the individual unit, the DC power is converted by an inverter (13) into AC power, and the AC power output from the inverter (13) is supplied to the plurality of electrical loads in a distributed manner by a distribution board (38) of the individual unit. On the other hand, a magnitude of DC power generated by the photovoltaic array or a lithium-ion battery and a magnitude of electrical power consumed by the electrical loads are compared by an electrical power comparator. Depending on the comparison result, an electrical power switch may supply the DC power via the inverter to the electrical loads or a low-voltage system, or may supply electrical power from the low-voltage system to the electrical loads or the lithium-ion battery.

20 Claims, 8 Drawing Sheets

(56) References Cited

U.S. PATENT DOCUMENTS

| | | | | |
|---|---|---|---|---|
| 2003/0047209 A1* | 3/2003 | Yanai | ............... | H02J 3/32 136/244 |
| 2003/0078797 A1* | 4/2003 | Kanbara | ............... | G06Q 30/00 705/412 |
| 2004/0125618 A1* | 7/2004 | De Rooij | ............... | H02J 1/102 363/17 |
| 2007/0276547 A1* | 11/2007 | Miller | ............... | G06Q 50/06 700/295 |
| 2008/0234871 A1* | 9/2008 | Yamada | ............... | G06Q 50/06 700/286 |
| 2010/0197222 A1* | 8/2010 | Scheucher | ............... | H01Q 19/30 455/11.1 |
| 2010/0262312 A1* | 10/2010 | Kubota | ............... | H01M 10/425 700/295 |
| 2012/0187913 A1* | 7/2012 | Abe | ............... | H01M 10/44 320/134 |
| 2014/0266289 A1* | 9/2014 | Della Sera | ............... | H02S 50/00 324/761.01 |

* cited by examiner

FEED SYSTEM TO BE USED IN RESIDENCE SUCH AS MULTI-UNIT APARTMENT COMPLEX

BACKGROUND OF THE INVENTION

1. Field of the Invention

The present invention relates to a feed system to be used in a multi-unit apartment complex, such as a condominium building, or a building which houses a plurality of companies (hereinafter, referred to as "residence such as multi-unit apartment complex"). The feed system supplies electrical power obtained from a photovoltaic array (solar panel), which is installed in a balcony of an individual unit of the residence such as a multi-unit apartment complex, to a plurality of electrical loads of the individual unit in a distributed manner.

2. Description of the Related Art

Nowadays, as part of global environmental measures, photovoltaic power systems have been widely put to practical use. The photovoltaic power systems convert solar energy into direct-current (DC) power using a photovoltaic array and convert, by an inverter, the DC power into alternating-current (AC) power so as to be available for supply to electrical loads connected to a commercial electrical power system (for example, see Japanese Patent Application Laid-open No. 09-045950).

In such a photovoltaic power system, the photovoltaic array is installed on the roof of a house or on the rooftop of a building so as to be oriented in the irradiation direction of sunlight. The photovoltaic array is formed by integrating a plurality of photovoltaic modules in a planar arrangement. A string is formed by connecting the plurality of photovoltaic modules in series, and arranged in a single line or in two lines or more in accordance with the number of photovoltaic modules disposed in the photovoltaic array to thereby set the size and capacity.

In addition, the number of power cables provided to take out electrical power generated by the photovoltaic array corresponds to the number of lines of the string, and the generated power is sent from each line of the string to the inverter via the power cables and a joint box. The inverter receives the DC power supplied from the photovoltaic array via the power cables, and converts the DC power into AC power having a commercial frequency and a boosted voltage of 110 V, for example.

The AC power is supplied to electrical loads, such as an illumination light, a refrigerator, a personal computer, and an office machine, which are connected to the commercial electrical power system. Such a photovoltaic power system is installed on the roof of a house or on the rooftop of a building as described above, and is particularly useful in compensating for insufficient electrical power at a time of high power demand for a commercial electrical power system, or the like.

However, such a conventional photovoltaic power apparatus has a configuration in which the photovoltaic array, which is a main component of the photovoltaic power apparatus, is installed on the roof of a single-family house or on the rooftop of a building. Therefore, the equipment and size of the photovoltaic power apparatus are comparatively on a large scale. In particular, a photovoltaic power apparatus having a photovoltaic array installed on the rooftop of a multi-unit apartment complex or building is managed by a manager of the multi-unit apartment complex or building, and used so that electrical power generated by the photovoltaic array is converted, by an inverter, into AC power, which is then distributed to all units in the multi-unit apartment complex or building. Accordingly, the capacities and equipment of the photovoltaic cells, inverter, and the like become on a large scale, which results in a high cost of operation and maintenance of the equipment and a high burden ratio of electrical power rates for each unit.

On the other hand, the power conversion efficiency of the photovoltaic array has been improved and the costs of the photovoltaic array have been significantly reduced due to mass production. As a result, today, it is becoming popular among residents of residences such as a multi-unit apartment complex to install the photovoltaic array and the like at individual units, namely, on their own, to thereby obtain the amount of electrical power required for each of the individual units and use the obtained electrical power to cover all or a part of the electrical power consumption, and, in this way, reduce commercial electrical power consumption (amount of power purchased from an electrical company).

SUMMARY OF THE INVENTION

The present invention has been made in view of the above-mentioned circumstances, and has an object to provide a power feed system capable of supplying efficiently and at low cost electrical power generated by a photovoltaic array to a plurality of electrical loads in an individual unit in a multi-unit apartment complex or building in a distributed manner. The photovoltaic array is installed by a resident himself/herself in a balcony of the individual unit.

In order to achieve the above-mentioned object, a feed system to be used in a residence such as a multi-unit apartment complex according to the present invention includes: a photovoltaic array to be installed in a balcony of an individual unit in a residence such as a multi-unit apartment complex, for generating DC power by receiving sunlight on the balcony; a lithium-ion battery for storing the DC power generated by the photovoltaic array; an inverter for converting one of the DC power generated by the photovoltaic array and the DC power discharged by the lithium-ion battery into AC power; a distribution board for supplying the AC power output from the inverter to a plurality of electrical loads of the individual unit in a distributed manner; an electrical power comparator for comparing a magnitude of one of the DC power generated by the photovoltaic array and the DC power generated by the lithium-ion battery and a magnitude of electrical power consumed by the plurality of electrical loads; and an electrical power switch configured to perform, depending on a result of the comparison by the electrical power comparator, one of supplying the DC power via the inverter to one of the plurality of electrical loads and a commercial electrical power system, and supplying the DC power to the lithium-ion battery one of from the commercial electrical power system to the plurality of electrical loads and via the inverter.

With the structure described above, it is possible to obtain electrical power required by a resident of an individual unit in a residence such as a multi-unit apartment complex, not from a photovoltaic array installed on the rooftop or the like by a manager who manages all the units of the residence such as a multi-unit apartment complex, but from a photovoltaic array purchased and installed in a balcony by the resident himself/herself. The obtained electrical power is, then, inexpensively supplied in a distributed manner to a plurality of electrical loads used in the housing unit or office unit of the resident. Accordingly, by preparing the photovoltaic array, the lithium-ion battery for storing electrical power, and the inverter for AC conversion which have capacities suitable for the daily power consumption and economic contexts of the resident, the resident may enhance the efficiency of electrical power usage through power selling.

Further, in the feed system to be used in a residence such as a multi-unit apartment complex according to the present invention, the electrical power comparator includes an electrical power switch for: automatically supplying, in a case of detecting usage equal to or less than maximum output power of the photovoltaic array, electrical power from the photovoltaic array to the plurality of electrical loads via the electrical power switch; and automatically supplying, in a case of detecting usage exceeding the maximum output power of the photovoltaic array, electrical power from the commercial electrical power system to the plurality of electrical loads.

With the structure described above, in the case where any one of the photovoltaic array, the lithium-ion battery, and the commercial electrical power system becomes unable to supply sufficient electrical power, it is possible to continuously supply electrical power to the electrical loads from any one of the remaining suppliers which has available capacity for electrical power supply. This prevents a serious impact on the electrical loads, such as breakdown of electronic devices and loss of data, due to unexpected blackouts.

Further, the feed system to be used in a residence such as a multi-unit apartment complex according to the present invention further includes a control device for enabling, during a time slot other than a midnight electrical power contract time, electrical power from the commercial electrical power system that is stored in a lithium-ion battery during one of the midnight electrical power contract time and a set time period, together with electrical power generated by the photovoltaic array, to be one of fed and sold to the commercial electrical power system during the daytime.

With the structure described above, cheap electrical power from the commercial electrical power system is stored in the lithium-ion battery during the midnight electrical power contract time. The electrical power cheaply stored in the lithium-ion battery may be, together with electrical power generated by the photovoltaic array during the daytime in excess of electrical power consumed by the electrical loads, supplied to the commercial electrical power system, and electrical power may be sold to the commercial electrical power system while electrical power is being supplied to the electrical loads.

Further, the feed system to be used in a residence such as a multi-unit apartment complex according to the present invention further includes a storage battery for midnight electrical power dedicated for storing midnight electrical power, the storage battery being provided in parallel to the lithium-ion battery.

With the structure described above, at the start of supply of electrical power to the electrical loads, even if the DC power generated by the photovoltaic array is insufficient, or, even if the electrical power stored in the lithium-ion battery is insufficient, electrical power discharged by the storage battery for midnight electrical power may be, together with the electrical power generated by the photovoltaic array, sold to the commercial electrical power system while electrical power is being supplied to the electrical loads. The amount of electrical power which is sold in this way becomes larger in accordance with an increase in the number of the installed storage batteries for midnight electrical power, and the amount of the stored electrical power and the amount of the sold electrical power may be increased accordingly.

Further, the feed system to be used in a residence such as a multi-unit apartment complex according to the present invention further includes: an electrical power data controller for controlling electrical power data including an amount of electrical power generated at present by the photovoltaic array used in one of the residence and premises, an amount of used electrical power, and an amount of electrical power remaining in a storage battery; and a wireless LAN router for exchanging on the Internet the electrical power data controlled by the electrical power data controller. The electrical power supply system enables the electrical power data controlled by the electrical power data controller to be checked from a computer or a multifunctional mobile terminal such as a smartphone or a tablet computer which is connected to the Internet and supports a wireless LAN.

With the structure described above, the photovoltaic electrical power, the used electrical power, and the amount of electrical power remaining in the lithium-ion battery which are measured with a wattmeter or a voltmeter may be monitored through an access to a personal computer or a multifunctional mobile terminal, and, based on the result of the monitoring, switching of the supplier of the electrical power to the electrical loads between the commercial electrical power system and the photovoltaic panel in accordance with the electrical power consumed at a specific time or during a specific time slot and switching of the lithium-ion battery between charging and discharging in accordance with the amount of electrical power remaining in the lithium-ion battery are commanded via a personal computer or a multifunctional mobile terminal. Under a wireless LAN environment using Wi-Fi, electrical power control with regard to electrical power demand may be monitored and performed at high speed.

Note that, the present invention relates to a multi-unit apartment complex or the like, but a stand-alone house is also included in the category.

According to the present invention, the electrical power generated by the photovoltaic array, which is installed in the balcony or the like by the resident himself/herself of the individual unit in the multi-unit apartment complex or building, can be supplied efficiently and at low cost to a plurality of electrical loads in a distributed manner. As a result, it is possible to prevent a serious impact on the electrical loads, such as breakdown of electronic devices, due to unexpected blackouts.

The present invention has been briefly described above. Further, the best mode for carrying out the present invention is described in detail hereinbelow with reference to the accompanying drawings.

DETAILED DESCRIPTION OF THE PREFERRED EMBODIMENTS

Hereinbelow, a feed system to be used in a residence such as a multi-unit apartment complex according to an embodiment of the present invention is described with reference to FIGS. 1 to 5.

Figure 1:
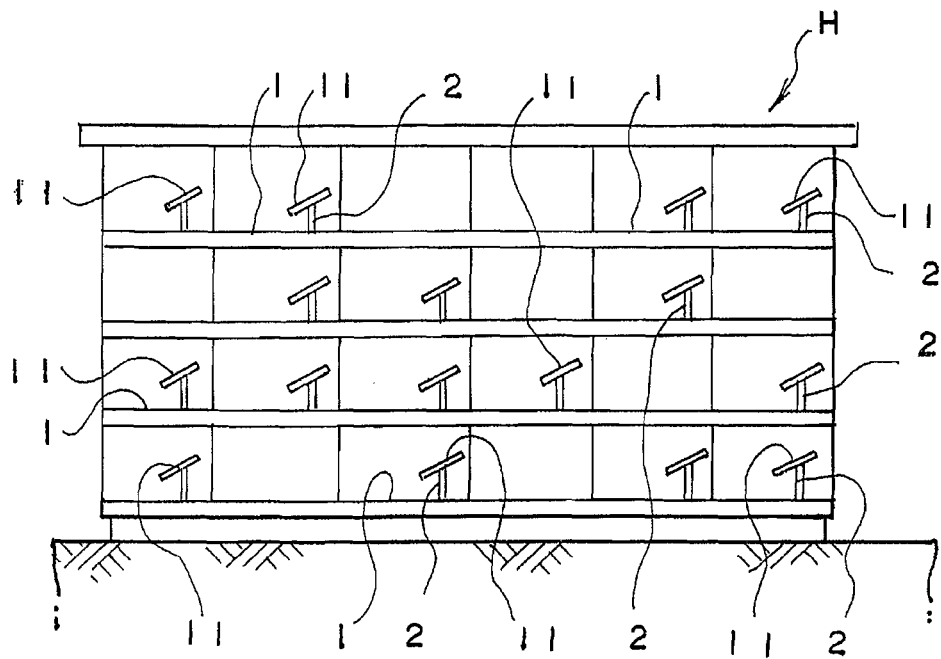
FIG. 1 is a conceptual diagram of a feed system to be used in a residence such as a multi-unit apartment complex according to an embodiment of the present invention.
Figure 2:
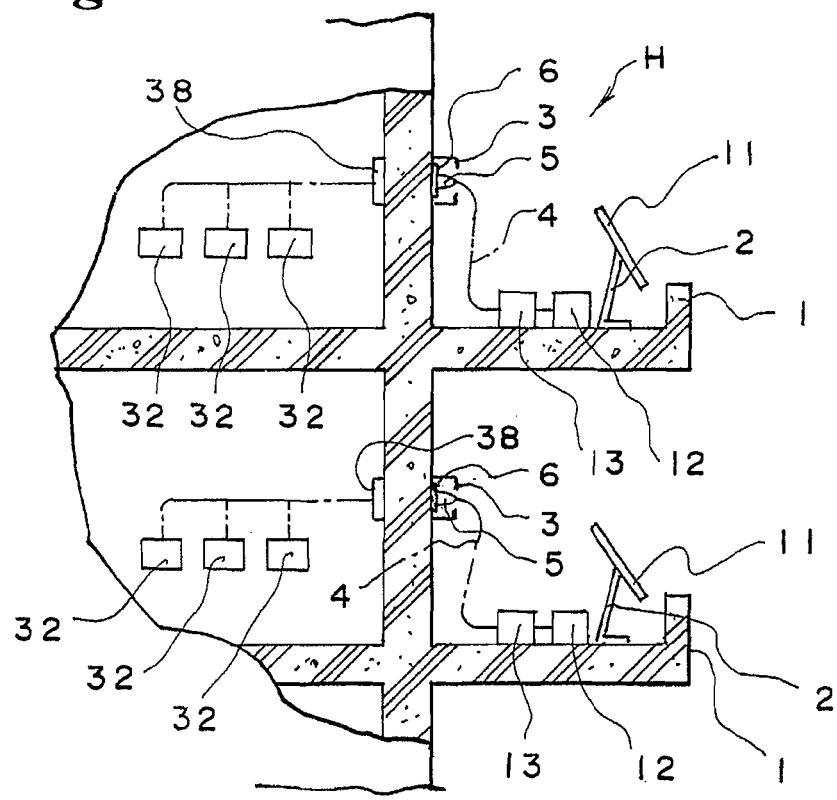
FIG. 2 is an explanatory diagram illustrating an example of installation of the feed system of FIG. 1.
Figure 3:
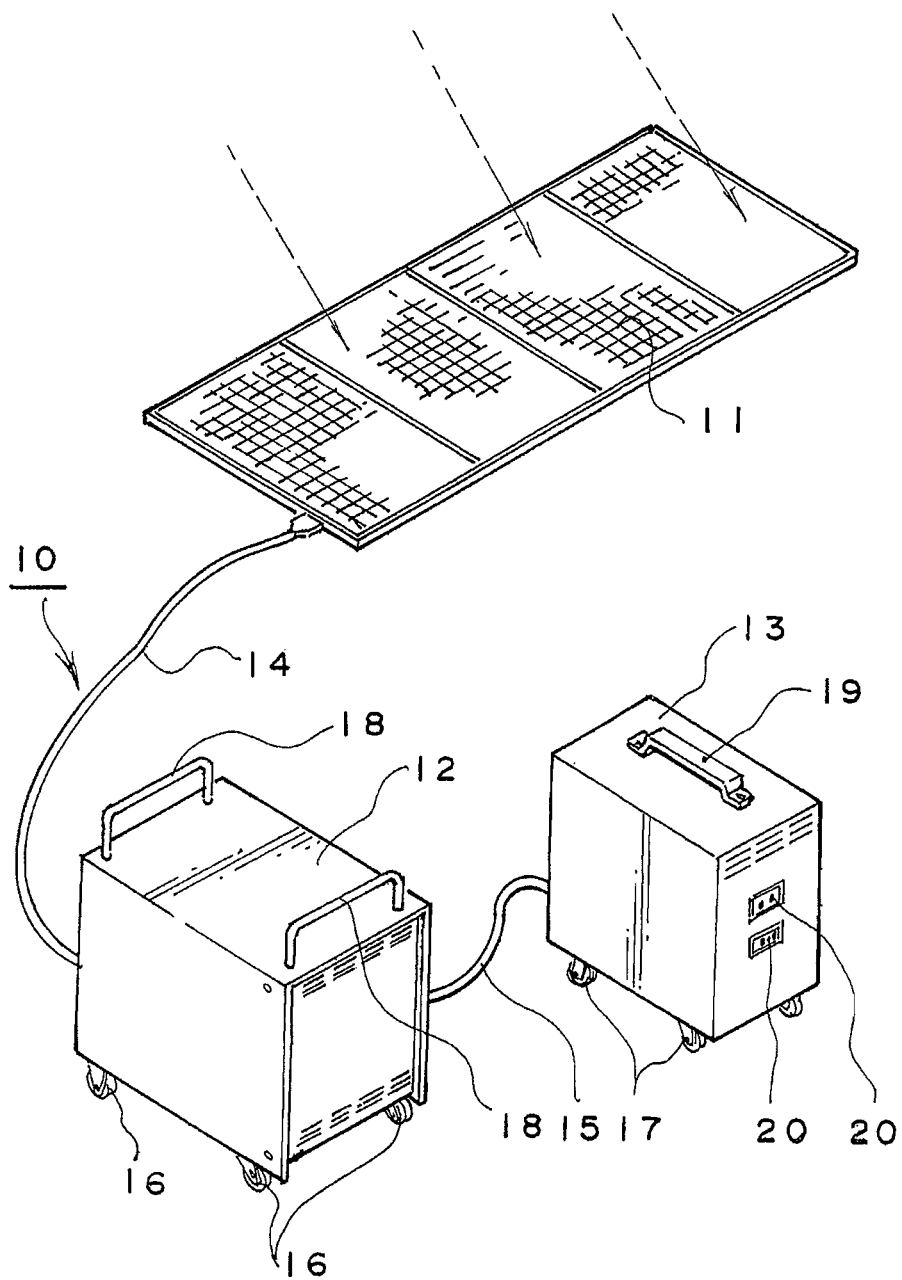
FIG. 3 is a perspective view of the feed system of FIG. 2.

FIG. 1 illustrates the feed system to be used in a residence such as a multi-unit apartment complex according to the embodiment of the present invention. FIG. 2 illustrates an example of installation of the feed system. FIG. 3 is a perspective view of the feed system of FIG. 2. Referring to FIGS. 1 to 3, a reference symbol H denotes a multi-unit apartment complex, such as a condominium building, and a balcony 1 is provided for each unit on a south-side wall to extend in a horizontal direction. In the balcony 1 of each unit, a photovoltaic array (solar panel) 11 purchased by a resident himself/herself is installed. At the unit of the resident who has installed the photovoltaic array 11 in the balcony 1, one or both of commercial electrical power supplied by an electrical power company and electrical power generated by the photovoltaic array 11 can be used. In the case where the electrical power generated by the photovoltaic array 11 exceeds the electrical power consumption, it is possible to sell the generated electrical power in excess to the commercial system side.

The photovoltaic array 11 is installed in the balcony 1 so that the light receiving surface is oriented in the incident direction of sunlight, as illustrated in FIGS. 1 to 3. As for the photovoltaic array 11, products which are small in size and weight but have high capacities and high power generation efficiency (power conversion efficiency) have been offered to a market one after another. The photovoltaic array 11 used in this embodiment is configured to be light weight, allow easy transport, handling, and installation, and be foldable and unfoldable. Accordingly, even a resident himself/herself of the multi-unit apartment complex H, who is a general user, is able to easily transport the photovoltaic array 11 to the balcony 1 and then easily install and assemble the photovoltaic array 11.

In addition, assembly of an installation platform 2 for installing the photovoltaic array 11 on the balcony 1 and mounting of the photovoltaic array 11 on the installation platform 2 can be handled by the resident himself/herself. Further, electrical connection of the photovoltaic array 11, a lithium-ion battery 12, and an inverter 13 can also be handled by the resident himself/herself in a simple manner, for example, by inserting plugs of power cables 14 and 15 into outlets. The size and weight of the installation platform 2 and the length and thickness of the power cables 14 and 15 are determined depending on the weight, capacity, size and the like of the photovoltaic array 11, the lithium-ion battery 12, and the inverter 13.

The lithium-ion battery 12 stores DC power generated by the photovoltaic array 11, and the inverter 13 converts the DC power into AC power so as to be available for supply to electrical loads. On an exterior wall surface of the multi-unit apartment complex H or the like, which is a surface facing the balcony 1, a junction box 3 is provided. In the junction box 3, an outlet 6 is installed for feeding AC power output from the inverter 13 to an indoor system. To the outlet 6, a plug 5 provided at one end of a power cable 4, which is connected to the inverter 13, is inserted.

The photovoltaic array 11 includes a plurality of photovoltaic modules arranged in parallel and formed by using a semiconductor material, such as silicon, so as to function as photoelectric conversion elements. Those plurality of photovoltaic modules are connected in series and parallel, and covered by a weather-resistant material. Specifically, for example, a light transmissive plate, such as a glass plate and a synthetic resin plate, is disposed on the light receiving surface of photovoltaic elements, and a Teflon (trademark) film or a weather-resistant film made of polyvinyl fluoride (PVF), polyethylene terephthalate (PET), or the like, is adhered to a non-light receiving surface, which is a back side of the light receiving surface. Thus, the photovoltaic array 11 has a layered structure in which the light transmissive plate, the photovoltaic elements, and the weather-resistant film are laminated one on top of another. The layered structure is a rectangular body, and a frame member made of, for example, aluminum is fixed to the peripheral surface of the rectangular body. In addition, a joint box is provided on the back side of the photovoltaic modules, and a terminal for taking in the output power of the photovoltaic modules is provided in the joint box.

On the other hand, the lithium-ion battery 12 is a small, light-weight, and high-withstand-voltage secondary battery with high energy density (Wh/L) and high specific energy density (Wh/Kg), and is connected to the photovoltaic array 11 via the power cable 14. The lithium-ion battery 12 stores voltage output from the photovoltaic array 11 and supplies necessary and stable DC power to the inverter 13. Further, the inverter 13 is connected to the lithium-ion battery 12 via the power cable 15, and converts the DC power supplied via the lithium-ion battery 12 into AC power. To the output side of the inverter 13, an AC capacitor and an AC reactor (both not shown) are connected for rectifying an AC output waveform from the inverter 13 to produce a sine wave.

The feed system used in a residence such as a multi-unit apartment complex, which is structured as described above, is comparatively reduced in weight and size. For example, the photovoltaic array 11 weighs 8 kg, the lithium-ion battery 12 to be connected to the photovoltaic array 11 weighs 50 kg, and the inverter 13 to be connected to the lithium-ion battery 12 weighs 4.5 kg. Therefore, each of the photovoltaic array 11, the lithium-ion battery 12, and the inverter 13 can be carried by the resident alone or with assistance from another person. In addition, the lithium-ion battery 12 and the inverter 13 are provided with wheels 16 and 17, respectively, on the lower surface of each case. With this, the lithium-ion battery 12 and the inverter 13 can be smoothly moved or glided over the floor at the time of operation of installing those components.

Further, the lithium-ion battery 12 has a pair of handles 18 fixed to the top surface of the case, and the inverter 13 has a handle 19 fixed to the top surface of the case. As a worker can hold the handles 18 and 19 with his/her hands, the handles 18 and 19 facilitate the worker to lift up and down the lithium-ion battery 12 and the inverter 13. This allows each of the lithium-ion battery 12 and the inverter 13 to be separately transported, as with the photovoltaic array 11. On the inverter 13, plug outlets 20 are provided in parallel, which are voltage output ports for electrical loads.

As described above, the photovoltaic array 11 and the lithium-ion battery 12 are connected to each other by the power cable 14, and the lithium-ion battery 12 and the inverter 13 are connected to each other by the power cable 15. In addition, the wheels 16 and 17 enable smooth transport of the lithium-ion battery 12 and the inverter 13. Therefore, the operation of connecting the power cables 14 and 15 to each other is easy. Accordingly, the feed system having such a structure can be easily transported and installed at the balcony 1 of the multi-unit apartment complex H or building, and easily achieves, at low cost, power feeding to the electrical loads used at houses and offices.

Figure 4:
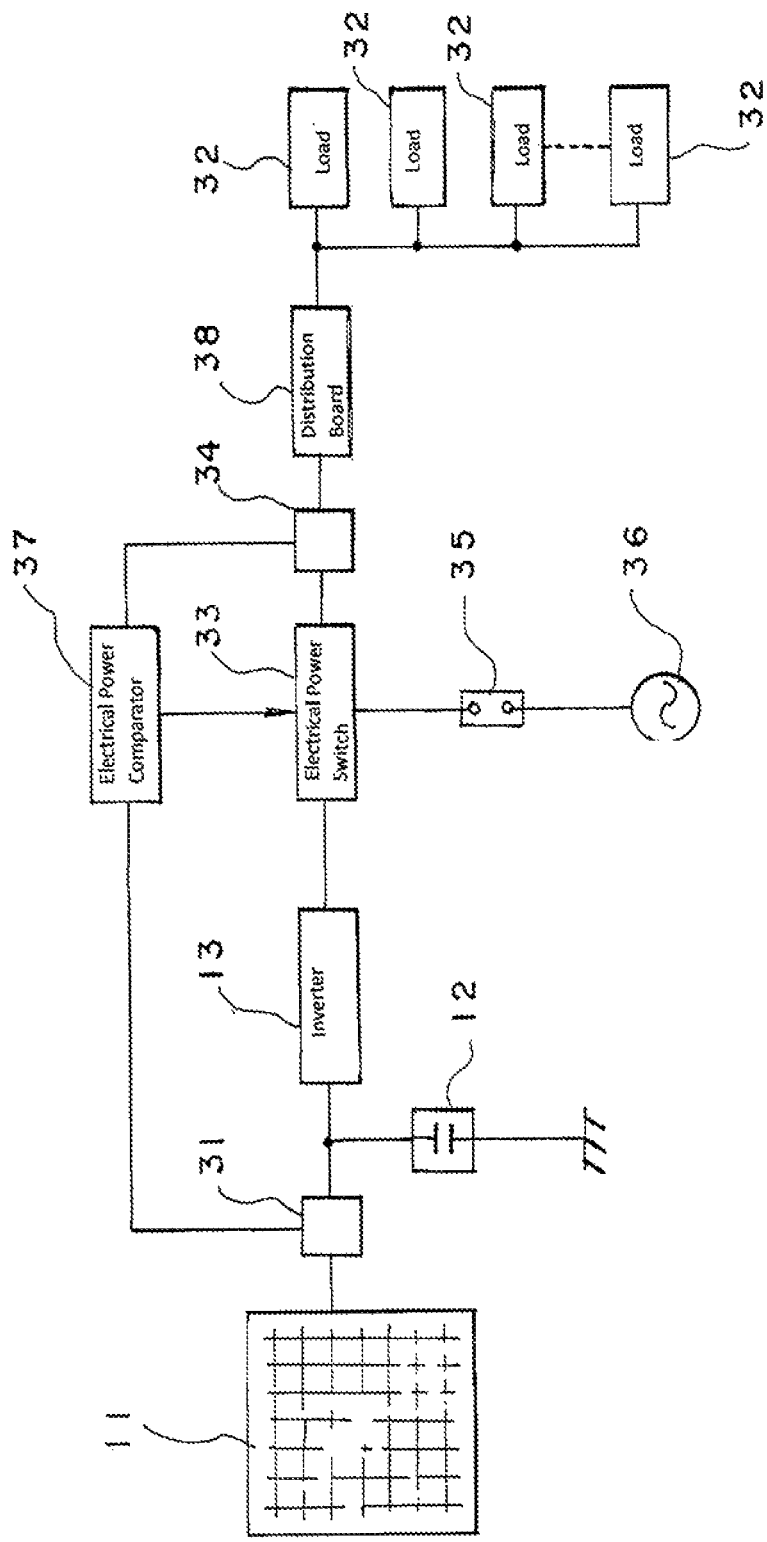
FIG. 4 is a circuit diagram of the feed system of FIG. 3.

FIG. 4 is a conceptual block diagram illustrating an electrical system of the feed system to be used in a residence such as a multi-unit apartment complex according to this embodiment. In the block diagram, a DC power detector 31 is connected between the photovoltaic array 11 and the lithium-ion battery 12 and between the photovoltaic array 11 and the inverter 13. In addition, an electrical power switch 33, a load power detector 34, and a distribution board 38 are connected to each other in series between the inverter 13 and electrical loads 32. The electrical power switch 33 is connected to a commercial electrical power system 36, via a switch 35. The distribution board 38 is installed on the indoor side of the individual unit, as illustrated in FIG. 2, and supplies AC power obtained via the inverter 13 to a plurality of electrical loads on the indoor side in a distributed manner. In addition, the electrical power switch 33 and the switch 35 are housed in the distribution board 38 or installed on the indoor side. An electrical power comparator 37 compares electrical power values detected by the respective power detectors 31 and 34.

In this circuit, DC power generated by the photovoltaic array 11 is stored in the lithium-ion battery 12, and DC power stabilized by the lithium-ion battery 12 is supplied to the inverter 13. The inverter 13 converts the DC power into AC power having a commercial frequency so as to be available for supply to the commercial electrical power system electrical loads 32 through the power cable 4 having a plug (not shown) which is inserted into the plug outlet 20 of FIG. 3, the plug 5 provided at the other end of the power cable 4, the outlet 6, and the distribution board 38 (see FIG. 2). The low-voltage system electrical loads 32 are, for example, a household refrigerator, an illumination light, and an office machine, such as a fax machine.

On the other hand, the DC power detector 31 detects electrical power at both terminals of the lithium-ion battery 12, and the load power detector 34 detects electrical power consumed by the electrical loads 32. The electrical power detected by the respective power detectors 31 and 34 is input to the electrical power comparator 37, and the electrical power comparator 37 then inputs, to the electrical power switch 33, a switching control signal corresponding to the difference in the electrical power values.

In the case where an electrical power value A detected by the DC power detector 31 is sufficiently larger than an electrical power value B detected by the load power detector 34 (A>B), the electrical power comparator 37 switches the electrical power switch 33 so that the AC power from the inverter 13 is supplied to the electrical loads 32 through the distribution board 38, and also supplied (sold) to the commercial electrical power system 36 via the switch 35. On the other hand, in the case where the electrical power value A detected by the DC power detector 31 is equal to the electrical power value B detected by the load power detector 34 (A=B), the electrical power switch 33 is switched so as to block the electrical power supply from the inverter 13 to the commercial electrical power system 36 and continue the electrical power supply to the electrical loads 32.

On the other hand, in the case where the electrical power value A detected by the DC power detector 31 is lower than the electrical power value B detected by the load power detector 34 (A<B), the electrical power switch 33 is switched so that the supply of the AC power from the inverter 13 to the electrical loads 32 is stopped, but electrical power from the commercial electrical power system 36 via the switch 35 is supplied to the electrical loads 32 through the distribution board 38. In this case, while the charge of the lithium-ion battery 12 is continued, electrical power of the commercial electrical power system 36 is purchased so as to continuously supply electrical power to the electrical loads 32. With this, the electrical loads 32 operate or are driven continuously without interruption of electrical power supply.

Accordingly, the feed system to be used in a residence such as a multi-unit apartment complex, which is structured as described above, enables easy handling and has broad utility. Thus, a clean energy feed system in accordance with electrical power consumption of an individual unit can be easily established at low cost by only installing the photovoltaic array 11, the lithium-ion battery 12, and the inverter 13 in the balcony 1 of the individual unit in the multi-unit apartment complex H or the like.

Thus, in the feed system to be used in a residence such as a multi-unit apartment complex according to this embodiment, the photovoltaic array 11 for generating DC power by receiving sunlight at the balcony 1 is installed in the balcony 1 of an individual unit in the residence such as a multi-unit apartment complex. With this, the DC power generated by the photovoltaic array 11 is stored in the lithium-ion battery 12 and, by the inverter 13, the DC power generated by the photovoltaic array 11 or DC power discharged by the lithium-ion battery 12 is converted into AC power. Then, the AC power output from the inverter 13 can be supplied to the plurality of electrical loads 32 of the individual unit in a distributed manner.

Accordingly, with the feed system, electrical power generated by the photovoltaic array, which is purchased and installed in a balcony or the like by a resident himself/herself of an individual unit in a multi-unit apartment complex or building, can be supplied efficiently and at low cost to a plurality of electrical loads in a distributed manner. As a result, it is possible to achieve the use of clean energy produced without fossil fuels at the individual unit.

Figure 5:
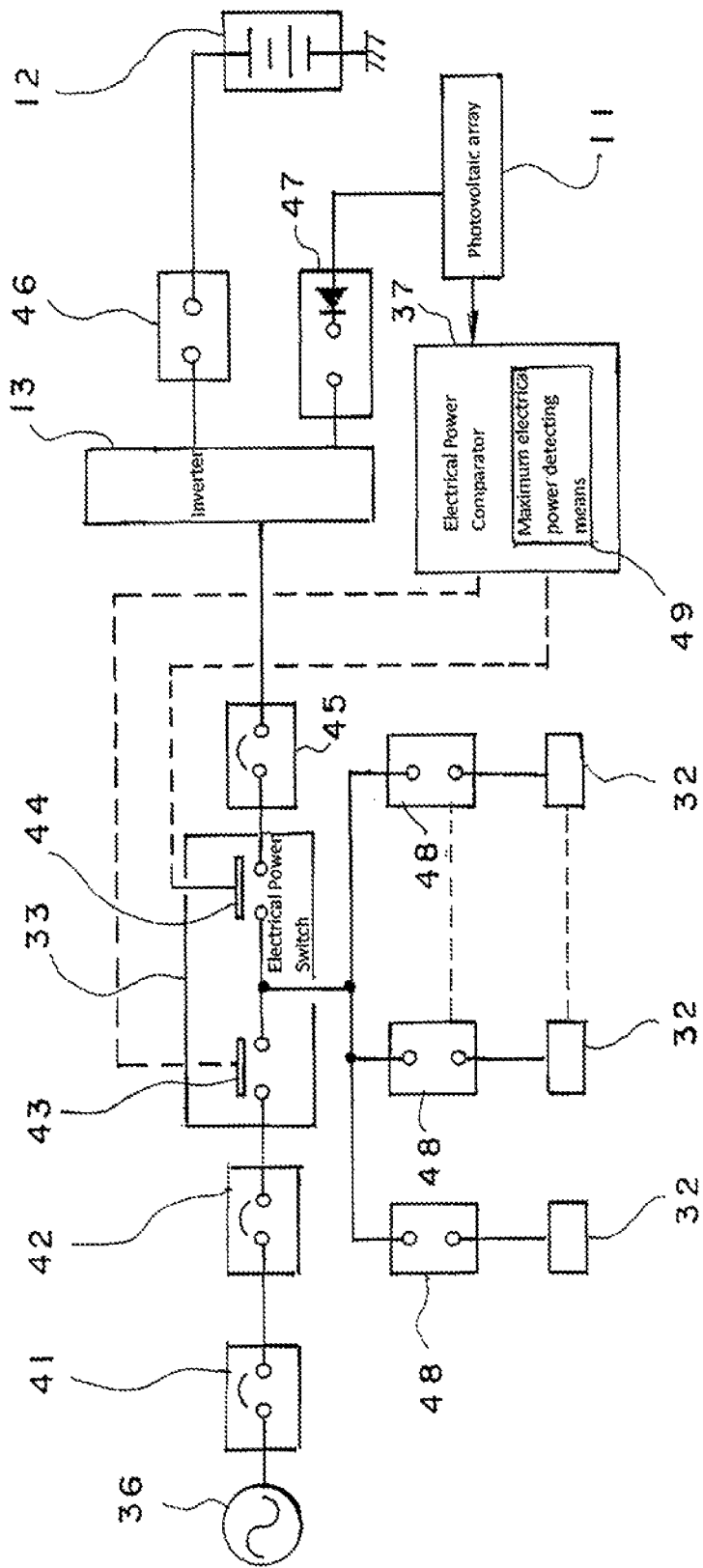
FIG. 5 is a circuit diagram of an electrical power transfer circuit which enables transfer of electrical power from a commercial electrical power system to electrical loads illustrated in FIG. 4.

FIG. 5 illustrates an example of a power transfer circuit for enabling automatic electrical power transfer from the commercial electrical power system 36 to the electrical loads 32 by using the electrical power comparator 37 and the electrical power switch 33 of FIG. 4 in the case where electrical power consumption of the electrical loads 32 connected exceeds the maximum output power of the photovoltaic array 11. In the power transfer circuit, a current limiting breaker 41 connected to the commercial electrical power system 36, an earth leakage breaker 42, and a first switch 43 are connected in series in the stated order. To the first switch 43, an earth leakage breaker 45 for the inverter 13 is connected via a second switch 44, and the inverter 13 is connected to the earth leakage breaker 45.

To the inverter 13, the lithium-ion battery 12 is connected via a lithium-ion battery switch 46. With a different line, the inverter 13 is connected to the photovoltaic array 11 via a switch 47 having a backflow prevention element (backflow prevention diode). In addition, an electrical load system, that is, the plurality of electrical loads 32, each of which is connected via an electrical load switch 48, are connected in parallel to a part of the circuit, the part connecting the first switch 43 and the second switch 44.

On the other hand, to the photovoltaic array 11, maximum electrical power detecting means 49 is connected for detecting the maximum electrical power of the photovoltaic array 11. In the case of detecting the use of the electrical loads 32 at power usage equal to or less than the maximum output power of the photovoltaic array 11, the maximum electrical power detecting means 49 turns off (opens) the first switch 43 and turns on (closes) the second switch 44 so that electrical power supply is enabled from the photovoltaic array 11 to the electrical loads 32.

On the other hand, in the case of detecting the use of the electrical loads 32 at power usage exceeding the maximum output power of the photovoltaic array 11, the maximum electrical power detecting means 49 turns on the first switch 43 and turns off the second switch 44 so that a predetermined amount of electrical power exceeding the maximum electrical power can be supplied from the commercial electrical power system 36 to the electrical loads 32. In this case, by turning on the first switch 43 and the second switch 44 at the same time, it is possible to also use electrical power supplied from the lithium-ion battery 12, which is a secondary battery, and the photovoltaic array 11 together. With this, it is possible to readily deal with large electrical loads.

In the power transfer circuit, the maximum electrical power detecting means 49 monitors the maximum output voltage of the photovoltaic array 11. In the case where the electrical loads 32 are used at a voltage equal to or less than the maximum output voltage of the photovoltaic array 11, the maximum electrical power detecting means 49 enables the electrical power supply operation to be maintained by closing the second switch 44 to pass the DC power generated by the photovoltaic array 11 through the inverter 13 so that the DC power is converted into AC power, and then supplying the AC power to the electrical loads 32 via the earth leakage breaker 45 and the second switch 44.

On the other hand, when the photovoltaic array 11 is used at a voltage exceeding the maximum output voltage, the maximum electrical power detecting means 49 detects the usage and closes the first switch 43 while opening the second switch 44 to automatically supply only the commercial electrical power to the electrical loads 32 via the current limiting breaker 41, the earth leakage breaker 42, and the first switch 43. Accordingly, even if the AC power through the inverter 13 is blocked, the electrical loads 32 are able to operate continuously with no interruption by using the commercial electrical power.

Note that, in the case where the power usage of the electrical loads 32 exceeds 500 W, which is the above-mentioned maximum output (for example, in the case of 1,000 W), the maximum electrical power detecting means 49 can detect the power usage exceeding 500 W so as to control both the first switch 43 and the second switch 44 to be turned on. In this case, the commercial electrical power system 36 covers an amount exceeding the capacity of the lithium-ion battery 12 and the maximum electrical power of the photovoltaic array 11 so that the power transfer circuit can deal with the large electrical loads described above.

In addition, in the case where the commercial electrical power system 36 is supplying AC power to the electrical loads 32, the AC power may be input via the first switch 43 and the second switch 44 to the inverter 13, which converts the AC power into DC power, so that the DC power is stored in the lithium-ion battery 12. In this case, mode switching is performed in which the maximum electrical power detecting means 49 turns on both the first switch 43 and the second switch 44. Note that, the electrical power supply system according to the above-mentioned embodiment may be adopted for a multi-unit apartment complex as well as a stand-alone house.

Thus, in the case where any one of the photovoltaic array, the lithium-ion battery, and the commercial electrical power system becomes unable to supply sufficient electrical power, it is possible to continuously supply electrical power to the electrical loads 32 from any one of the remaining suppliers which has available capacity for electrical power supply. This prevents a serious impact on the electrical loads, such as breakdown of electronic devices and loss of data, due to unexpected blackouts.

Further, by increasing the capacity for storing electrical power of the lithium-ion battery 12 which is a storage battery and by enabling usage or selling, during the daytime, of midnight electrical power stored therein during the midnight, the amount of usage of the commercial electrical power may be suppressed to lower the electrical power rate. Up to now, when the amount of electrical power generated by the photovoltaic array 11 during the daytime exceeds the capacity of the lithium-ion battery, the electrical power in excess is sold to the commercial electrical power supply system side of the commercial electrical power system 36.

However, even if DC power generated by the photovoltaic array (solar panel) during the daytime, in which sufficient solar energy can be obtained, may be supplied to the electrical loads or may be sold during the daytime in which electrical power is highly used, a time period in which sufficient solar energy may be always sufficiently obtained varies depending on the weather, and thus, it is difficult to sell (supply) electrical power stored in the lithium-ion battery 12 to the commercial electrical power system always with stability.

In view of the above, during the midnight electrical power contract time (during the set time period), sufficient electrical power from the commercial electrical power system is stored in the lithium-ion battery 12, and, during the daytime (time slot other than the midnight electrical power contract time), the electrical power stored in the lithium-ion battery 12 is sold to the commercial electrical power system 36 while electrical power is being supplied to the electrical loads 32. Therefore, in this power selling system, even if the electrical power stored in the lithium-ion battery 12 is insufficient, the electrical power discharged by the storage battery for midnight electrical power enables selling, for a long time, of electrical power to the commercial electrical power system while electrical power is being supplied to the electrical loads 32. The amount of electrical power which is sold in this way may become larger in accordance with an increase in the number of the installed lithium-ion batteries, and the amount of the stored electrical power and the amount of the sold electrical power may be increased accordingly.

Figure 6:
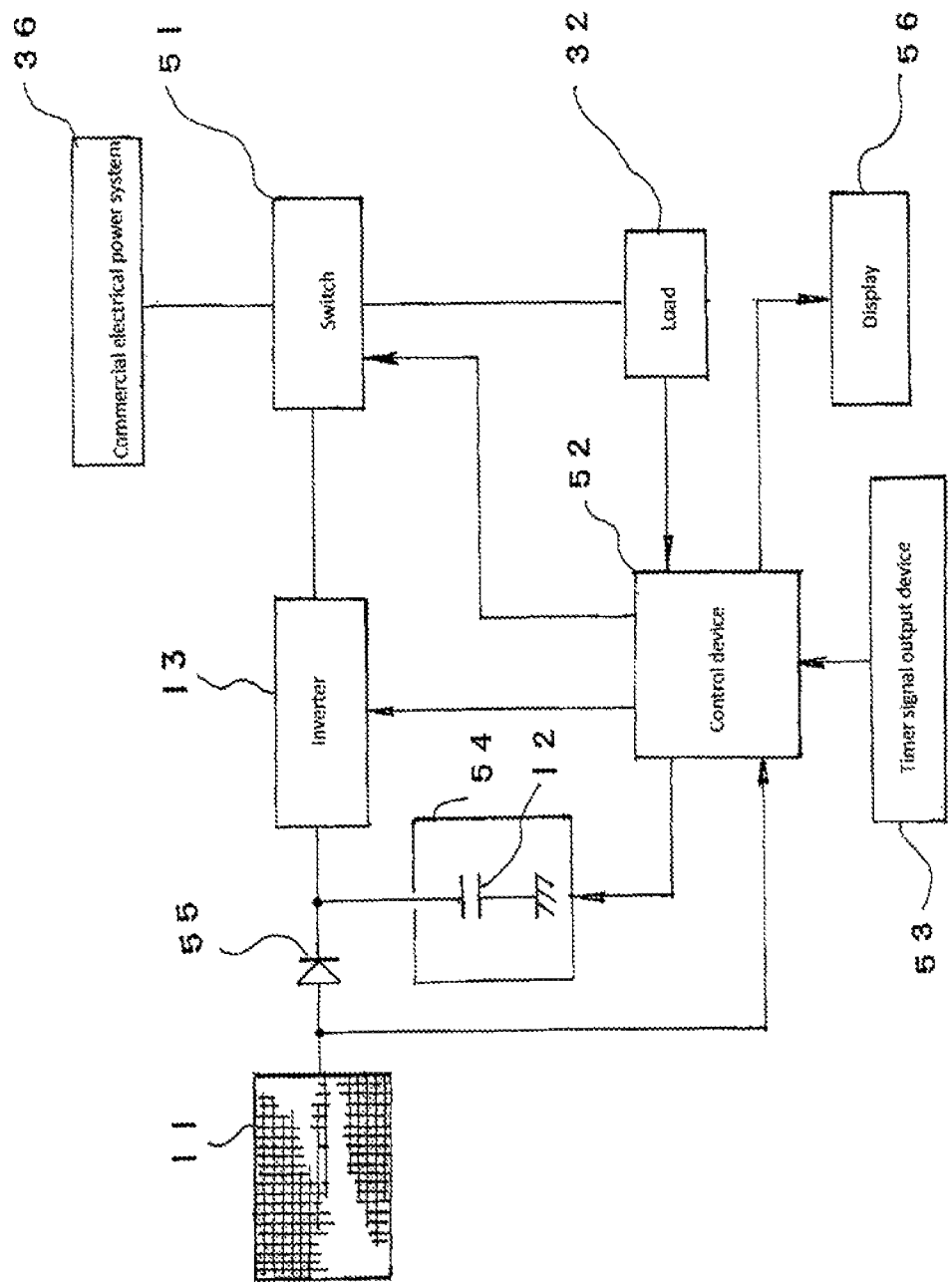
FIG. 6 is a block diagram illustrating a power selling system according to the embodiment of the present invention.

As illustrated in FIG. 6, the power selling system according to the embodiment of the present invention includes the photovoltaic array (solar panel) 11, the battery 12, the inverter (electrical power converter) 13, a switch 51, a control device 52, and a timer signal output device 53 for midnight electrical power. Among those components, for example, a plurality of the photovoltaic arrays 11 are installed on the rooftop of a building of the user or on the roof of a house of the user.

A capacitor 54 includes one or a plurality of the lithium-ion batteries 12, and functions to charge/discharge, in/from the lithium-ion batteries 12, electrical power which is generated by the photovoltaic array 11 or is supplied from the outside (commercial electrical power system). When the amount of electrical power generated by the photovoltaic array 11 exceeds the amount of electrical power consumed by the electrical loads 32, the lithium-ion battery 12 may store electrical power, if any, in excess of the electrical power consumed by the electrical loads 32, and may supply the stored electrical power to the electrical loads 32 when the amount of electrical power generated by the photovoltaic array 11 is smaller than the amount of electrical power consumed by the electrical loads 32.

Further, the lithium-ion battery 12 functions to store midnight electrical power. The storage battery 12 functions to replenish the remaining amount of electrical power which is lowered by supplying electrical power to the electrical loads 32 during the daytime, and also functions to supply electrical power to the commercial electrical power system 36. Therefore, the lithium-ion battery 12 used in this embodiment desirably has a sufficiently high electrical power storing capacity, and further, it is advantageous to use a lithium-ion battery or a lithium-ion polymer battery which has a high voltage and a high energy density, which may quickly store electrical power, and which may generate high power. However, the present invention is not limited to such a lithium-ion battery or a lithium-ion polymer battery, and a NiCad battery, a nickel metal hydride battery, or the like may also be used as necessary.

The inverter 13 is a bidirectional DC/AC converter. The inverter 13 converts DC power generated by the photovoltaic array 11 or DC power discharged by the lithium-ion battery 12 into AC power synchronized with the phase of the AC power of the commercial electrical power system 36, and further, converts AC power from the commercial electrical power system 36 into DC power to enable storing of the electrical power in the lithium-ion battery 12. Note that, a DC/DC converter for amplifying DC power may be connected to the photovoltaic array 11 side of the inverter 13.

The switch 51 functions to switch and supply AC power, which is obtained by converting DC power from the photovoltaic array 11 or the lithium-ion battery 12 with the use of the inverter 13, to the commercial electrical power system 36 or the electrical loads 32, and further functions to switch and supply AC power supplied from the commercial electrical power system 36 to the lithium-ion battery 12 via the inverter 13, or to the electrical loads 32.

The control device 52 functions to control the charge/discharge of the lithium-ion battery 12, the electrical power conversion operation of the inverter 13, and the switch operation of the switch 51 based on the output value of DC power generated by the photovoltaic array 11, the value of electrical power consumed by the electrical loads 32, and the output value of the timer signal output device 53. Note that, a backflow prevention diode 55 for protecting the solar battery is connected at a point between the photovoltaic array 11 and the inverter 13 and between the photovoltaic array 11 and the lithium-ion battery 12. Further, by connecting a display 56 to the control device 52, the display 56 may display various necessary messages including the amount of electrical power remaining in the lithium-ion battery 12, the amount of sold electrical power, and the electrical power rate corresponding to the amount of electrical power.

In the power selling system of this embodiment, the photovoltaic array 11 receives sunlight during the daytime to generate a predetermined amount of DC power. The DC power is stored via the backflow prevention diode 55 in the lithium-ion battery 12. At this time, DC power in excess of the capacity of the lithium-ion battery 12 is converted by the inverter 13 into AC power synchronized with the phase of the AC power of the commercial electrical power system 36, and the AC power is then input to the switch 51.

The switch 51 supplies the AC power to any one or both of the electrical loads 32 and the commercial electrical power system 36. Further, the switch 51 may also be switched so as to feed, from the commercial electrical power system 36 via the inverter 13 to the lithium-ion battery 12, DC power obtained by conversion from AC power by the inverter 13, or, together with the feeding to the lithium-ion battery 12 or separately from the feeding, so as to supply AC power from the commercial electrical power system 36 to the electrical loads 32.

The control device 52 receives, as its inputs, the value of electrical power generated by the photovoltaic array 11 and the value of electrical power consumed by the electrical loads 32 to control operation of the lithium-ion battery 12, the inverter 13, and the switch 51. Further, the control device 52 controls the switch operation of the switch 51 based on an on/off signal of the timer signal output device 53.

The commercial electrical power system 36 may supply AC power via the switch 51 to the electrical loads 32 of the user, and, when the amount of electrical power which is output by the photovoltaic array 11 or the lithium-ion battery 12 is small or zero, supplies AC power via the switch 51 to the electrical loads 32 with stability.

In this case, when the amount of electrical power generated by the photovoltaic array 11 is sufficient, the control device 52 makes a comparison between the amount of electrical power consumed by the electrical loads 32 and the amount of DC power generated by the photovoltaic array 11. When the amount of the generated DC power is larger than the amount of electrical power consumed by the electrical loads 32, the electrical power in excess of the consumed electrical power is stored in the lithium-ion battery 12, and the electrical power in excess even after the storing in the storage battery 12 is supplied via the switch 51 to the commercial electrical power system 36 and the electrical loads 32. At this time, supply of electrical power from the commercial electrical power system 36 to the electrical loads 32 is temporarily interrupted, and no electrical power is purchased from the commercial electrical power system 36.

On the other hand, when the amount of DC power generated by the photovoltaic array 11 is smaller than the amount of electrical power consumed by the electrical loads 32, electrical power already stored in the lithium-ion battery 12 is supplied to the electrical loads 32. When the amount of electrical power stored in the storage battery 12 becomes small, AC power from the commercial electrical power system 36 is supplied via the switch 51 to the electrical loads 32, and the AC power is converted into DC power by the inverter 13 and the converted DC power is stored in the lithium-ion battery 12. Therefore, the electrical loads 32 receive the AC power from the commercial electrical power system 36 to continue its operation.

When the amount of electrical power consumed by the electrical loads 32 is larger than the amount of electrical power supplied by the commercial electrical power system 36, the amount of electrical power supplied by the commercial electrical power system 36 is reduced and sometimes the operation of the electrical loads 32 becomes unstable. In such case, if sufficient sunlight may be obtained, the photovoltaic array 11 may store a high level of DC power in the storage battery 12, and may supply the electrical power in excess even after the storing via the switch 51 to the commercial electrical power system 36. This enables the user to sell electrical power to the commercial electrical power system 36.

Further, the power selling system of this embodiment utilizes midnight electrical power. This midnight electrical power refers to electrical power which is supplied from the nighttime (for example, from 11 p.m.) until the next morning (for example, 7 a.m.) during which the amount of electrical power consumed by the electrical loads 32 connected to the commercial electrical power system 36 is small. The rate for midnight electrical power is considerably cheaper than the electrical power rate during the daytime, and for example, ⅓ to ¼ of the normal electrical power rate (during the daytime).

Therefore, even during the midnight when the photovoltaic array 11 does not generate electrical power, midnight (AC) electrical power obtained from the commercial electrical power system 36 is received (purchased) from the commercial electrical power system 36 via the switch 51 and the inverter 13, and DC power obtained by conversion by the inverter 13 is stored in the lithium-ion battery 12. This storing is carried out during the predetermined midnight time period irrespective of whether or not electrical power is supplied from the commercial electrical power system 36 to the electrical loads 32. Therefore, DC power is sufficiently stored in the lithium-ion battery 12 which has not been fully charged before the midnight, and the storage battery 12 is thus fully charged.

In the next morning, when the photovoltaic array 11 receives sunlight and generates a certain level of electrical power which may be supplied to the electrical loads 32, the control device 52 applies to the inverter 13 the DC power generated by the photovoltaic array 11 together with the DC power discharged by the lithium-ion battery 12 in which electrical power has been stored during the midnight, and the total DC power is converted into AC power. The AC power is a high-level electrical power obtained from both the photovoltaic array 11 and the lithium-ion battery 12.

Of the high-level AC power, electrical power in excess of the electrical power consumed by the electrical loads 32 connected to the commercial electrical power system 36 is supplied to the commercial electrical power system 36. By returning to the commercial electrical power system 36 the electrical power obtained by storing cheap midnight electrical power, the amount of usage of the electrical power supplied from the commercial electrical power system 36 to the user may be reduced and the electrical power rate may be lowered. The electrical power stored in the lithium-ion battery 12, the amount of electrical power sold to the commercial electrical power system 36, the price of the sold electrical power, and the like are displayed on the display 56. The charge/discharge of the lithium-ion battery 12, the electrical power conversion operation by the inverter 13, and the switch operation of the switch 51 are carried out by the control device 52 in accordance with a predetermined program.

Figure 7:
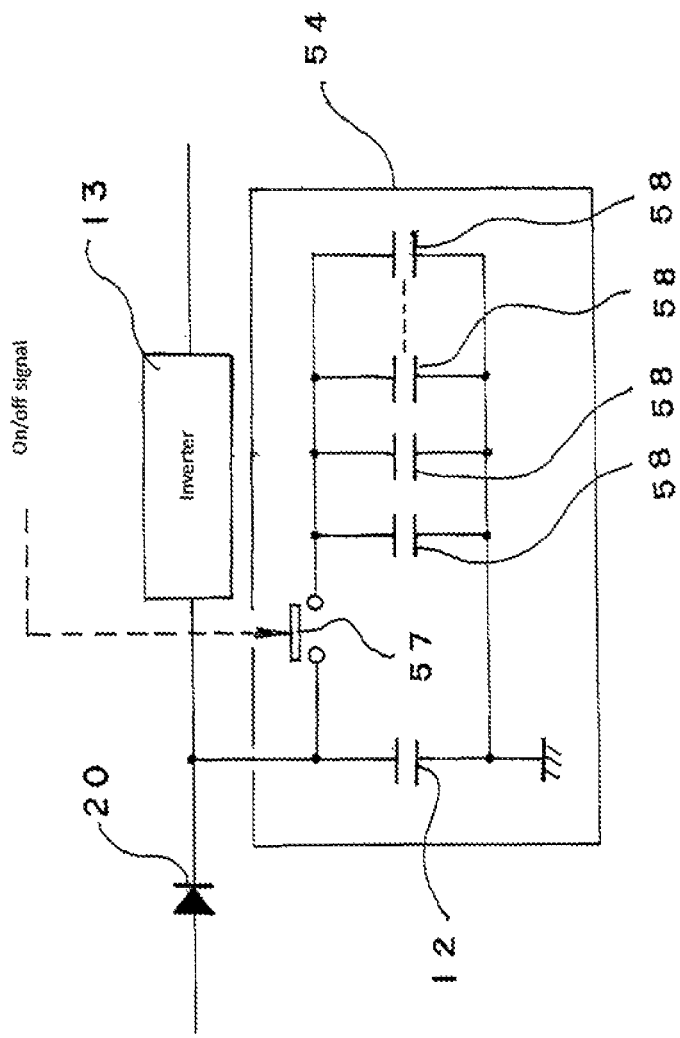
FIG. 7 is a circuit diagram illustrating a capacitor according to another embodiment of the present invention.

FIG. 7 is a diagram illustrating the capacitor 54 according to another embodiment of the present invention. In the capacitor 54, one or a plurality of storage batteries 58 for midnight electrical power are connected in parallel with the lithium-ion battery 12 with a timer switch 57 provided therebetween. In this embodiment, the timer switch 57 is controlled to be opened or closed in accordance with an on/off signal which is output by the timer signal output device 53 or a timing signal which is separately set. For example, the timer switch 57 is turned on during the time period when the midnight electrical power is supplied, which causes AC power supplied from the commercial electrical power system 36 to be input via the switch 51 to the inverter 13. DC power obtained by conversion by the inverter 13 is stored in the storage batteries 58 for midnight electrical power. The timer switch 57 is turned off at a timing at which all the storage batteries 58 for midnight electrical power are fully charged.

After the set time in the next morning (7 a.m.) at a timing at which the photovoltaic array 11 generates the sufficient level of DC power, the timer switch 57 is turned on. This causes DC power discharged by the storage batteries 58 for midnight electrical power and DC power generated by the photovoltaic array 11 to be input to the inverter 13. AC power obtained by conversion by the inverter 13 is supplied via the switch 51 to the commercial electrical power system 36. In this way, the midnight electrical power may be sold to the commercial electrical power system 36 at a timing at which electrical power is highly demanded during the daytime, and as a result, the user may enjoy the benefit of the lowered electrical power rate.

As described above, the photovoltaic array 11 which receives sunlight during the daytime generates electrical power, and further, the storage batteries 58 for midnight electrical power store electrical power from the commercial electrical power system 36 during the midnight electrical power contract time (during the set time period). During the time slot other than the midnight electrical power contract time, the electrical power generated by the photovoltaic array 11 is fed to the commercial electrical power system 36 together with the electrical power stored in the storage batteries 58 for midnight electrical power under the control of the control device 52. Therefore, electrical power from the commercial electrical power system 36 which is cheaply stored in the storage batteries 58 for midnight electrical power during the midnight electrical power contract time may be supplied to the commercial electrical power system 36 together with electrical power generated by the photovoltaic array 11 during the daytime in excess of the electrical power consumed by the electrical loads 32 of the electrical power, and further, electrical power may be sold to the commercial electrical power system 36 while electrical power is being supplied to the electrical loads 32.

By the way, in the electrical power supply system illustrated in FIG. 1, when the amount of electrical power generated by the photovoltaic array 11 is smaller than the amount of electrical power consumed by the electrical loads 32, and the amount of electrical power remaining in the lithium-ion battery 12 for making up for the electrical power shortage is insufficient, electrical power is supplied from the commercial electrical power system 36 to the electrical loads 32 and electrical power converted into DC power via the inverter 13 is stored in the lithium-ion battery 12. Therefore, in order to optimize control of the entire photovoltaic power system including such electrical power supply and conversion control and control of the electrical power, it is necessary to monitor electrical power data such as the amount of electrical power generated by the photovoltaic array 11, the amount of used electrical power, and the amount of electrical power remaining in the storage battery for storing the generated electrical power.

Generally, electrical power data such as the amount of electrical power generated by the photovoltaic array 11, the amount of used electrical power, and the amount of electrical power remaining in the storage battery may be centrally monitored with ease at a place where an instrument for measuring these amounts and values of electrical power (for example, the display 56 illustrated in FIG. 6) is installed.

However, it is generally difficult to perform remote monitoring away from the place where the measuring instrument is installed. Further, a method has been proposed in which remote monitoring of measurement values of these amounts of electrical power by the measuring instrument is performed over the Internet, but there is an inconvenience in that the communication rate of such monitor data is low.

Further, instructions for specific measures for saving energy and for saving electrical power based on electrical power data such as the amount of electrical power generated by the photovoltaic array, the amount of used electrical power, and the amount of electrical power remaining in the storage battery which are received over the Internet cannot be given at a high rate from a remote location to the home or premises of the user.

In view of the above, there are provided an electrical power data controller for controlling electrical power data such as the amount of electrical power generated at present by the photovoltaic power system used at home or premises of the user, the amount of used electrical power, and the amount of electrical power remaining in the storage battery, and a wireless LAN router for exchanging on the Internet the electrical power data controlled by the electrical power data controller. This enables the electrical power data controlled by the electrical power data controller to be checked from a computer or a multifunctional mobile terminal such as a smartphone or a tablet computer which is connected to the Internet and supports a wireless LAN.

Then, data of photovoltaic electrical power, used electrical power, and the amount of electrical power remaining in the storage battery which are obtained from a wattmeter for the photovoltaic electrical power, a wattmeter for the used electrical power, an instrument for measuring the amount of electrical power remaining in the storage battery, and the like connected to the wireless LAN at home or premises of the user are sent via the wireless LAN router to the personal computer or the multifunctional mobile terminal on the Internet. The personal computer and the multifunctional mobile terminal are connected via the Internet to the electrical power data controller on the wireless LAN.

Therefore, photovoltaic electrical power, used electrical power, and the amount of electrical power remaining in the storage battery which are measured by the wattmeter or voltmeter may be monitored through an access to the personal computer or the multifunctional mobile terminal, and, based on the result of the monitoring, switching of the supplier of the electrical power to the electrical loads between the commercial electrical power system and the photovoltaic panel in accordance with the electrical power consumed at a specific time or during a specific time period and switching of the storage battery between charging and discharging in accordance with the amount of electrical power remaining in the storage battery are commanded via a personal computer or a multifunctional mobile terminal. Under a wireless LAN environment using Wi-Fi, electrical power control with regard to electrical power demand may be monitored and performed at high speed.

The electrical power information service system is described with reference to FIGS. 8 and 9. The electrical power information service system illustrated in FIG. 8 includes at home 61 an electrical power data controller 62 for controlling electrical power data such as the amount of electrical power generated at present by the photovoltaic array 11, the amount of used electrical power, and the amount of electrical power remaining in the lithium-ion battery 12. The electrical power data controller 62 collects the electrical power data from a wattmeter for measuring the amount of photovoltaic electrical power generated by the photovoltaic array 11, a wattmeter for measuring the amount of electrical power used by the electrical loads, an instrument for measuring the amount of electrical power remaining in the storage battery for storing the photovoltaic electrical power, and the like via LAN cables 63a, 63b, 63c, . . . and 63n of a home LAN, processes the collected data, and stores the processed data in an electrical power information database which is described below.

The electrical power data are sent via a wireless LAN 64 and a wireless LAN router 65 connectable to the Internet to a personal computer 67 or a multifunctional mobile terminal 68 such as a smartphone or a tablet computer which supports a wireless LAN (Wi-Fi) and is connected to the Internet 66. In other words, under a wireless LAN environment using Wi-Fi, the electrical power information service system may send at a high rate to the personal computer 67 or the multifunctional mobile terminal 68 electrical power data such as the amount of electrical power generated at present by the photovoltaic array 11, the amount of electrical power used by the electrical loads, and the amount of electrical power remaining in the storage battery, which are each electrical power data at home 61.

In this case, electrical power data such as the amount of electrical power generated at present by the photovoltaic array 11, the amount of electrical power used by the electrical loads, and the amount of electrical power remaining in the storage battery are also sent to terminals which support a wireless LAN and which are installed at home 61 including a personal computer 69 and a multifunctional mobile terminal 70 such as a smartphone or a tablet computer.

Figure 8:
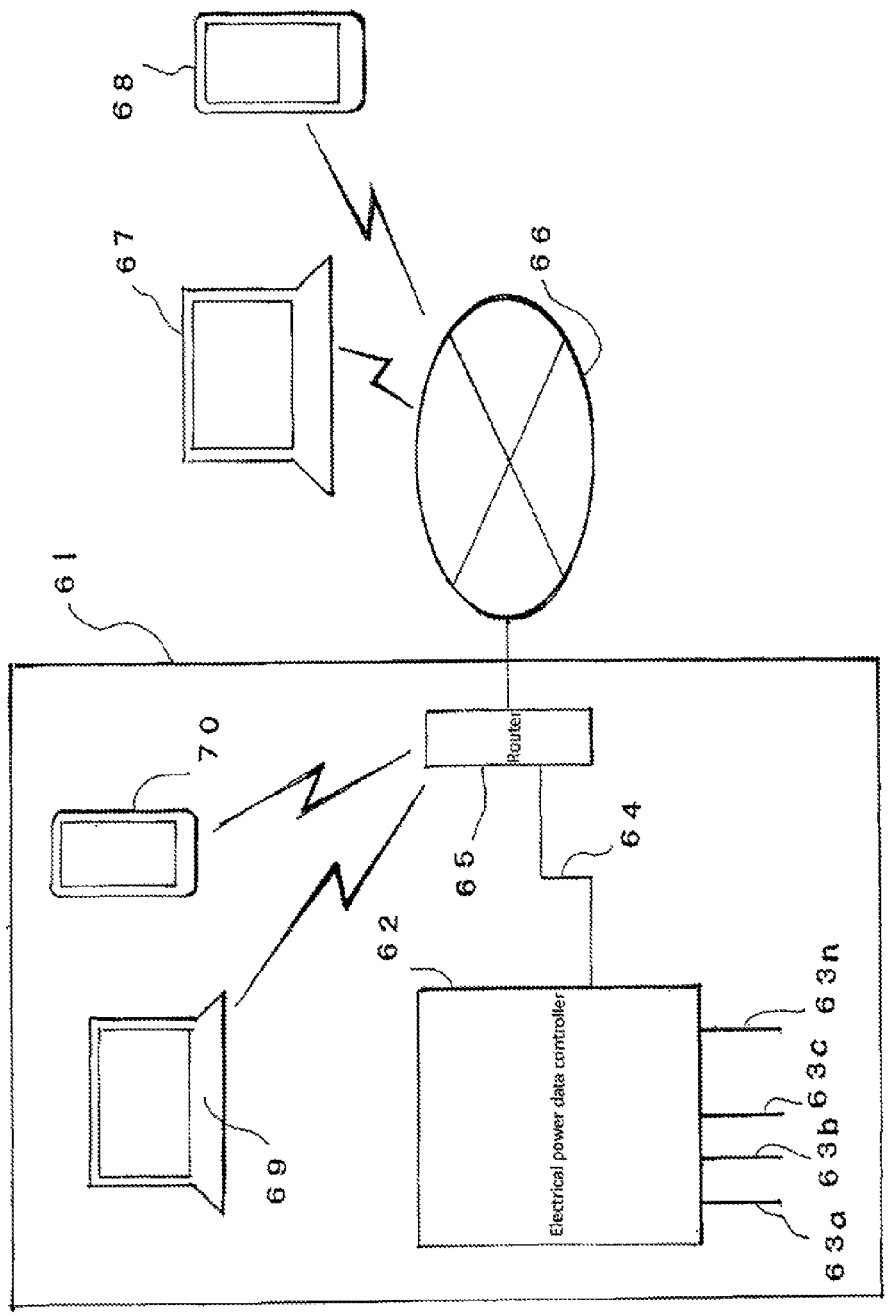
FIG. 8 is a conceptual diagram illustrating an electrical power information service system according to the embodiment of the present invention.
Figure 9:
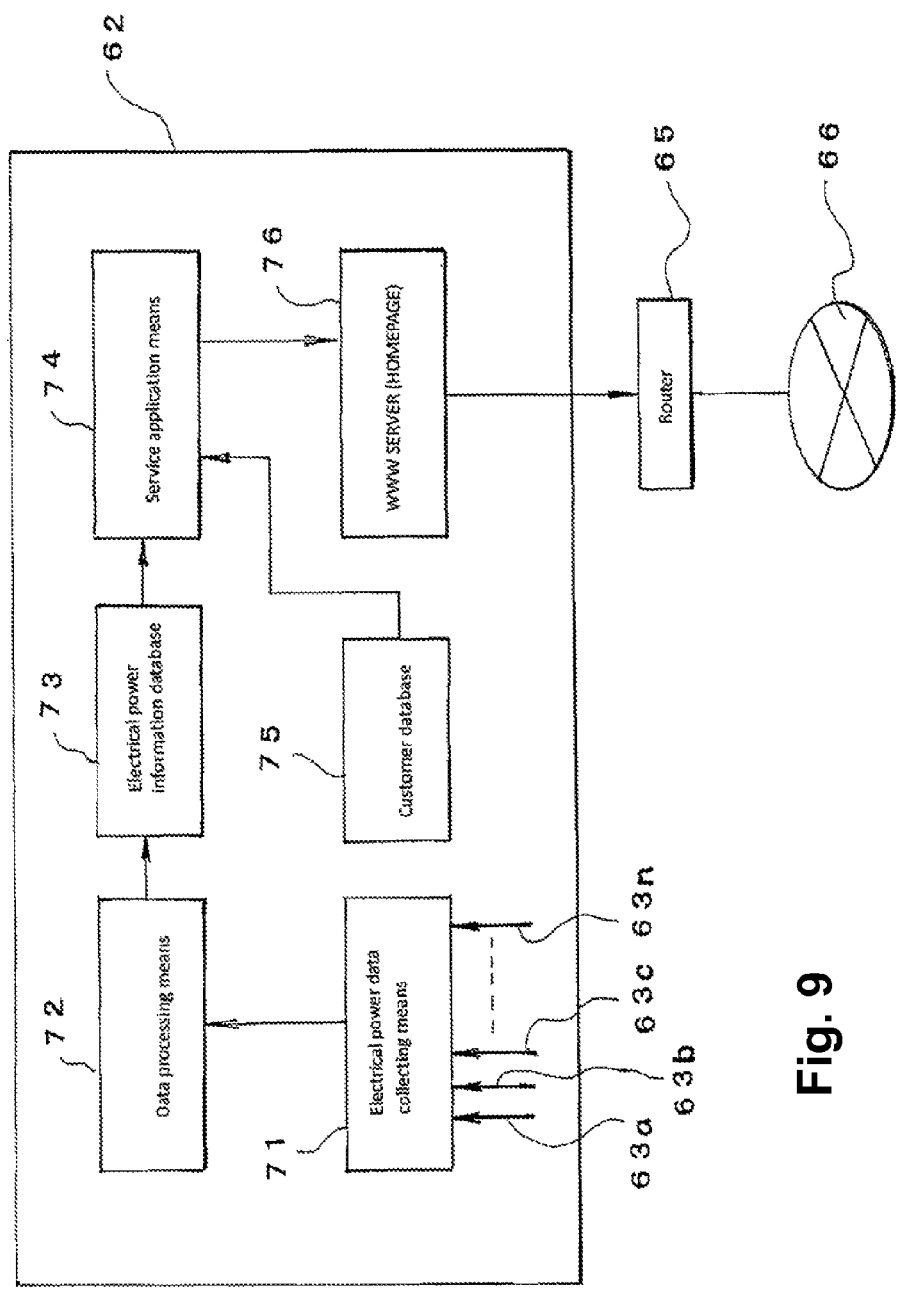
FIG. 9 is a block diagram illustrating an electrical power data controller illustrated in FIG. 8.

FIG. 9 illustrates a specific example of the electrical power data controller 62 illustrated in FIG. 8. The electrical power data controller 62 includes electrical power data collecting means 71, data processing means 72, an electrical power information database 73, service application means 74, a customer (destination) database 75, and a web (www) server (homepage) 76. Among them, the electrical power data collecting means 71 includes a CPU, a program memory, and the like, and provides readings of the respective amounts of electrical power from the respective measuring instruments such as a wattmeter at predetermined intervals (collection time intervals) in accordance with an electrical power amount collection program stored in the program memory for various kinds of electrical power amounts (the amount of electrical power generated at present by the photovoltaic array 11, the amount of electrical power used by the electrical loads, the amount of electrical power remaining in the storage battery, and the like), and sets the data in a collected data table with regard to the respective kinds of electrical power.

The data processing means 72 includes a CPU, a program memory, and the like, and, in accordance with a data processing program stored in the program memory, processes the collected electrical power data of a registered user (customer), that is, electrical power data such as the amount of electrical power generated by the photovoltaic array 11, the amount of electrical power used by the electrical loads, and the amount of electrical power remaining in the storage battery which are collected by the electrical power data collecting means 71, and stores the processed electrical power data in the electrical power information database 73.

The service application means 74 includes a CPU, a program memory, and the like, and a user registration processing program which operates in accordance with a service application program for sending electrical power information and which is for the purpose of registering personal information of a user who wants to obtain the electrical power information service in the customer (user) database 75, and a user service program for establishing a homepage of the electrical power data controller 62 on the web server 76 and for providing electrical power information service when an access is made to the homepage with an user ID and a password being checked are prepared for the service application means 74.

In the electrical power information service system with the configuration described above, when a user makes an access to the homepage on the web server 76 which corresponds to user information registered in the customer database 75 from the personal computer 67 or 69 or the multifunctional mobile terminal 68 or 70, a registration acceptance page is provided for the personal computer 67 or 69 or the multifunctional mobile terminal 68 or 70 of the user whose electrical power information service registration is accepted. Through the registration acceptance page, personal data which are input by the user are acquired.

The personal data are registered together with the user ID. The respective pieces of electrical power data (such as the amount of electrical power generated by the photovoltaic array 11, the amount of electrical power used by the electrical loads 32, and the amount of electrical power remaining in the lithium-ion battery 12) which correspond to the registered user ID are collected by the data collecting means 71, and the collected pieces of data are stored in the collected data table after the data is associated with the time of reception and a classification code of the electrical power data. The respective pieces of electrical power data collected in this way are sent to the data processing means 72.

The data processing means 72 stores the collected data in the electrical power information database 73 which is associated with user information from which the data is collected. The service application means 74 creates an electrical power data display page in accordance with user service processing, and sends the page to the personal computer 67 or 69 or the multifunctional mobile terminal 68 or 70 which made an access to the homepage on the Internet 66 via the web server 76 and the wireless LAN router 65 so that the page may be displayed thereon. This enables the user to promptly check with ease the respective pieces of electrical power data on the screen of the personal computer 67 or 69 or the multifunctional mobile terminal 68 or 70.

The feed system to be used in a residence such as a multi-unit apartment complex according to the present invention has an effect in which electrical power generated by the photovoltaic array, which is installed in a balcony or the like by a resident himself/herself of an individual unit in a multi-unit apartment complex or building, can be supplied efficiently and at low cost to a plurality of electrical loads of the individual unit in a distributed manner. In addition, the power supply is achieved without electrical power interruptions through electrical power transfer from the commercial electrical power system. The feed system to be used in a residence such as a multi-unit apartment complex according to the present invention is useful as a solar feed system for enabling supply of electrical power generated from solar energy to electrical loads of an individual unit.

What is claimed is:

1. An electrical power supply system, comprising:
   a photovoltaic array to be installed in a balcony of an individual unit in a residence such as a multi-unit apartment complex, for generating DC power by receiving sunlight on the balcony;
   a lithium-ion battery for storing the DC power generated by the photovoltaic array, said lithium-ion battery comprising a lithium-ion battery interface detachably connecting said lithium-ion battery to said photovoltaic array, said lithium-ion battery comprising a battery cable connector interface;
   an inverter for converting one of the DC power generated by the photovoltaic array and the DC power discharged by the lithium-ion battery into AC power, said inverter comprising an inverter cable connector interface;
   a distribution board for supplying the AC power output from the inverter to a plurality of electrical loads of the individual unit in a distributed manner;
   an electrical power comparator for comparing a magnitude of one of the DC power generated by the photovoltaic array and the DC power generated by the lithium-ion battery and a magnitude of electrical power consumed by the plurality of electrical loads; and
   an electrical power switch configured to perform, depending on a result of the comparison by the electrical power comparator, one of supplying the DC power via the inverter to one of the plurality of electrical loads and a commercial electrical power system, and supplying the DC power to the lithium-ion battery from one of the commercial electrical power system to the plurality of electrical loads and via the inverter, each of the lithium-ion battery and the inverter comprising a wheel on a lower surface of a case thereof and each of the lithium-ion battery and the inverter comprising a handle on a top surface of the case, the lithium-ion battery and the inverter being connectable to a power cable for allowing electrical power supply and electrical power reception between the lithium-ion battery and the inverter, said power cable being exclusively detachably connected to said battery cable connector interface and said inverter cable connector interface.

2. An electrical power supply system according to claim 1, wherein the electrical power comparator comprises an electrical power switch for:
   automatically supplying, in a case of detecting usage equal to or less than maximum output power of the photovoltaic array, electrical power from the photovoltaic array to the plurality of electrical loads via the electrical power switch; and
   automatically supplying, in a case of detecting usage exceeding the maximum output power of the photovoltaic array, electrical power from an AC power system to the plurality of electrical loads.

3. An electrical power supply system according to claim 1, further comprising a control device for enabling, during a time slot other than a midnight electrical power contract time, electrical power from the commercial electrical power system that is stored in the lithium-ion battery during one of the midnight electrical power contract time and a set time period, together with electrical power generated by the photovoltaic array, to be one of fed and sold to the commercial electrical power system.

4. An electrical power supply system according to claim 3, further comprising a storage battery for midnight electrical power dedicated for storing midnight electrical power, the storage battery being provided in parallel to the lithium-ion battery.

5. An electrical power supply system according to claim 1, further comprising:
   an electrical power data controller for controlling electrical power data including an amount of electrical power generated at present by the photovoltaic array used in one of the residence such as the multi-unit apartment complex and premises, an amount of used electrical power, and an amount of electrical power remaining in said lithium-ion battery; and a wireless LAN router for exchanging on the Internet the electrical power data controlled by the electrical power data controller, wherein the electrical power supply system enables the electrical power data controlled by the electrical power data controller to be checked from a terminal including one of a computer and a smartphone which is connected to the Internet and supports a wireless LAN.

6. An electrical power supply system according to claim 1, wherein said power cable extends exclusively from said inverter to said lithium-ion battery.

7. An electrical power supply system, comprising:
a photovoltaic array to be installed in a balcony of an individual unit in a residence for generating DC power by receiving sunlight on the balcony;
a lithium-ion battery for storing the DC power generated by the photovoltaic array, said lithium-ion battery comprising a lithium-ion battery case, a plurality of first wheels and a lithium-ion battery handle, said lithium-ion battery case comprising a battery case top surface and a battery case lower surface, said lithium-ion battery handle being mounted to said battery case top surface, said plurality of first wheels being mounted to said battery case lower surface, said battery comprising a battery photovoltaic array connector interface and a lithium-ion battery cable connector interface, said battery being detachably connected to said photovoltaic array via at least said battery photovoltaic array connector interface;
an inverter for converting one of the DC power generated by the photovoltaic array and the DC power discharged by the lithium-ion battery into AC power, said inverter comprising an inverter case, a plurality of second wheels and an inverter handle, said inverter case comprising an inverter case top surface and an inverter case lower surface, said inverter handle being mounted to said inverter top surface, said plurality of second wheels being mounted to said inverter case lower surface, said inverter comprising an inverter cable connector interface;
a distribution board for supplying the AC power output from the inverter to a plurality of electrical loads of the individual unit in a distributed manner;
an electrical power comparator for comparing a magnitude of one of the DC power generated by the photovoltaic array and the DC power generated by the lithium-ion battery and a magnitude of electrical power consumed by the plurality of electrical loads; and
a power cable having a first end portion and a second end portion, said first end portion being detachably connected to said lithium-ion battery cable connector interface and said second end portion being detachably connected to said inverter cable connector interface, wherein electrical power is supplied and received between said lithium-ion battery and said inverter via said power cable.

8. An electrical power supply system according to claim 7, wherein the electrical power comparator comprises an electrical power switch for:
automatically supplying, in a case of detecting usage equal to or less than maximum output power of the photovoltaic array, electrical power from the photovoltaic array to the plurality of electrical loads via the electrical power switch; and automatically supplying, in a case of detecting usage exceeding the maximum output power of the photovoltaic array, electrical power from an AC power system to the plurality of electrical loads.

9. An electrical power supply system according to claim 7, further comprising a control device for enabling, during a time slot other than a midnight electrical power contract time, electrical power from the commercial electrical power system that is stored in lithium-ion battery during one of the midnight electrical power contract time and a set time period, together with electrical power generated by the photovoltaic array, to be one of fed and sold to the commercial electrical power system.

10. An electrical power supply system according to claim 9, further comprising a storage battery for midnight electrical power dedicated for storing midnight electrical power, the storage battery being provided in parallel to the lithium-ion battery.

11. An electrical power supply system according to claim 7, further comprising:
an electrical power data controller for controlling electrical power data including an amount of electrical power generated at present by the photovoltaic array used in one of the residence such as the multi-unit apartment complex and premises, an amount of used electrical power, and an amount of electrical power remaining in said lithium-ion battery; and
a wireless LAN router for exchanging on the Internet the electrical power data controlled by the electrical power data controller, wherein the electrical power supply system enables the electrical power data controlled by the electrical power data controller to be checked from a terminal including one of a computer and a smartphone which is connected to the Internet and supports a wireless LAN.

12. An electrical power supply system according to claim 7, wherein said power cable extends exclusively from said inverter to said lithium-ion battery.

13. An electrical power supply system, comprising:
a photovoltaic array to be installed in a balcony of an individual unit in a residence for generating DC power by receiving sunlight on the balcony;
a lithium-ion battery for storing the DC power generated by the photovoltaic array, said lithium-ion battery comprising a lithium-ion battery case, a plurality of first wheels and a lithium-ion battery handle, said lithium-ion battery case comprising a battery case top surface, a battery case first side surface, a battery case second side surface and a battery case lower surface, said battery case top surface and said battery case bottom surface being located between said battery case first side surface and said battery case second side surface, said lithium-ion battery handle being mounted to said battery case top surface, said plurality of first wheels being mounted to said battery case lower surface, said lithium-ion battery comprising a first battery mating interface and a second battery mating interface, said lithium-ion battery being connected to said photovoltaic array via at least said first battery mating interface;
an inverter for converting one of the DC power generated by the photovoltaic array and the DC power discharged by the lithium-ion battery into AC power, said inverter comprising an inverter case and an inverter cable mating interface, a plurality of second wheels and an inverter handle, said inverter case comprising an inverter case top surface, an inverter case first side surface, an inverter case second side surface and an inverter case lower surface, said inverter case top surface and said inverter case lower surface being located between said inverter case first side surface and said inverter case second side surface, said inverter handle being mounted to said inverter top surface, said plurality of second wheels being mounted to said inverter case lower surface;

a distribution board for supplying the AC power output from the inverter to a plurality of electrical loads of the individual unit in a distributed manner;

an electrical power comparator for comparing a magnitude of one of the DC power generated by the photovoltaic array and the DC power generated by the lithium-ion battery and a magnitude of electrical power consumed by the plurality of electrical loads; and a power cable detachably coupled exclusively with said second battery mating interface and said inverter cable mating interface, wherein electrical power is at least supplied from said lithium-ion battery to said inverter via said power cable.

14. An electrical power supply system according to claim 13, wherein the electrical power comparator comprises an electrical power switch for:

automatically supplying, in a case of detecting usage equal to or less than maximum output power of the photovoltaic array, electrical power from the photovoltaic array to the plurality of electrical loads via the electrical power switch; and automatically supplying, in a case of detecting usage exceeding the maximum output power of the photovoltaic array, electrical power from an AC power system to the plurality of electrical loads.

15. An electrical power supply system according to claim 13, further comprising a control device for enabling, during a time slot other than a midnight electrical power contract time, electrical power from the commercial electrical power system that is stored in lithium-ion battery during one of the midnight electrical power contract time and a set time period, together with electrical power generated by the photovoltaic array, to be one of fed and sold to the commercial electrical power system.

16. An electrical power supply system according to claim 15, further comprising a storage battery for midnight electrical power dedicated for storing midnight electrical power, the storage battery being provided in parallel to the lithium-ion battery.

17. An electrical power supply system according to claim 13, further comprising:

an electrical power data controller for controlling electrical power data including an amount of electrical power generated at present by the photovoltaic array used in one of the residence such as the multi-unit apartment complex and premises, an amount of used electrical power, and an amount of electrical power remaining in said lithium-ion battery; and a wireless LAN router for exchanging on the Internet the electrical power data controlled by the electrical power data controller, wherein the electrical power supply system enables the electrical power data controlled by the electrical power data controller to be checked from a terminal including one of a computer and a smartphone which is connected to the Internet and supports a wireless LAN.

18. An electrical power supply system according to claim 13, wherein said power cable extends exclusively from said inverter to said lithium-ion battery.

19. An electrical power supply system according to claim 13, wherein said battery case top surface is located opposite said battery case lower surface, said battery case first side surface being located opposite said battery case second side surface, said inverter case top surface being located opposite said inverter case lower surface, said inverter case first side surface being located opposite said inverter case second side surface.

20. An electrical power supply system according to claim 19, wherein said battery case first side surface is parallel to said battery case second side surface, said battery case top surface being parallel to said battery case lower surface, said battery case first side surface and said battery case second side surface being perpendicular to said battery case top surface and said battery case lower surface, said inverter case first side surface being parallel to said inverter case second side surface, said inverter case top surface being parallel to said inverter case lower surface, said inverter case first side surface and said inverter case second side surface being perpendicular to said inverter case top surface and said inverter case lower surface.

* * * * *